Patented July 14, 1942

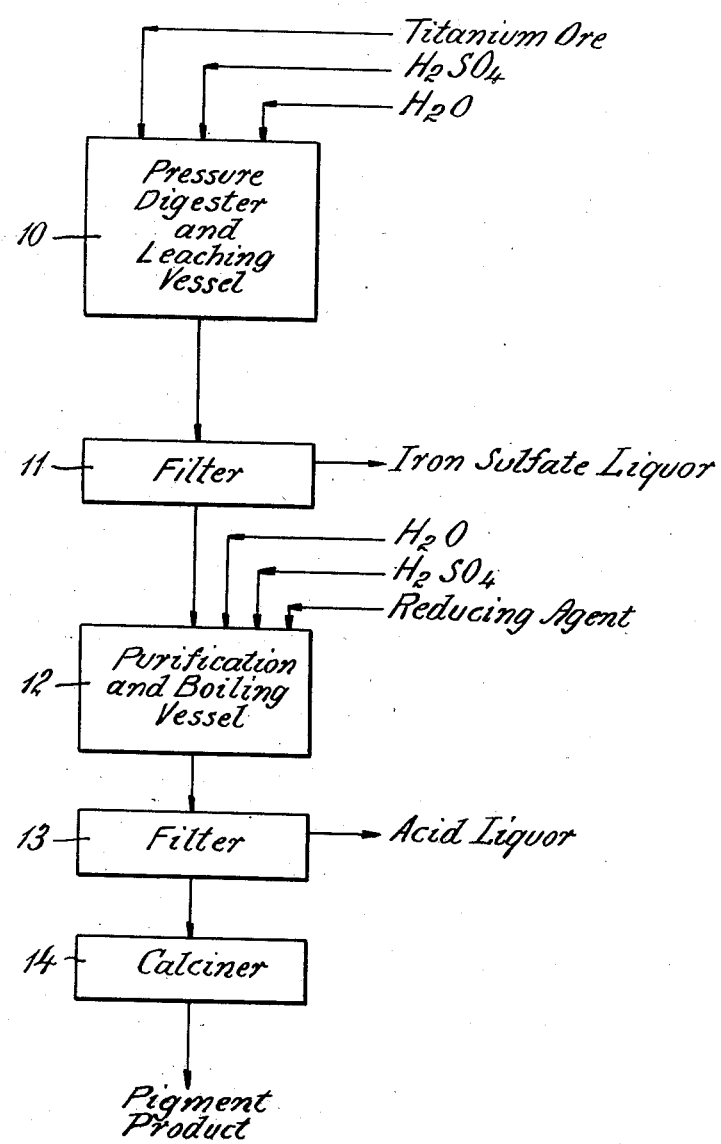

2,290,112

UNITED STATES PATENT OFFICE 2,290,112

MANUFACTURE OF TITANIUM OXIDE

Henry F. Merriam, West Orange, N. J., and Maxwell J. Brooks, New York, N. Y., assignors to General Chemical Company, New York, N. Y., a corporation of New York Application April 20, 1939, Serial No. 269,043

3 Claims. (Cl. 23—202)

This invention relates to the manufacture of titanium oxide pigments.

In the usual prior methods for making titanium oxide pigments of commercial grade, ilmenite is digested with sulfuric acid in such a way as to form a solid mass comprising titanium sulfate, ferrous and ferric sulfates, and some variable amounts of undigested ore and gangue. The cake is leached with water to form a solution consisting chiefly of titanium sulfate, and ferrous and ferric sulfates. The liquor is treated to reduce ferric sulfate to ferrous sulfate, clarified and filtered, and diluted with water and boiled to hydrolytically precipitate water insoluble titanium compound in the form of metatitanic acid. The precipitate is filtered out, washed, usually purified to remove associated $SO_3$, and calcined at temperatures of 800–1000° C. to convert the crude metatitanic acid to titanium oxide having pigment properties.

Prior methods of this general type involve many objectionable features chief among which is the generally complicated nature of the procedure including many separate steps and requiring large expenditures for plant construction, maintenance and operation. While some of the major phases such as digesting the ore with sulfuric acid present no particular difficulties, other parts of the operation such as hydrolysis must be very closely controlled and even then uniformity of the final product is difficult to obtain. Other important objections include the necessity for handling large volumes of relatively dilute liquors and high loss of soluble titanium. In some instances use of titanium ores high in ferric iron is objectionable because of the resulting high ferric sulfate content of the titanium sulfate-iron sulfate liquor prior to hydrolysis. Metallic iron is the customary reducing agent, and where the ferric sulfate content of the liquor is high and metallic iron is used to reduce ferric iron to ferrous just before hydrolyzing, the iron content of the liquor becomes so high that the metatitanic acid precipitated by hydrolysis may be highly contaminated with iron.

The principal object of the present invention is to provide a method for the manufacture of titanium oxide pigments of commercial grade by procedure relatively simple as compared with common practice. Another object of the invention is provision of an easily carried out process especially suited for use of titanium ores high in ferric iron. The invention may be understood from the following description taken in connection with the accompanying flow sheet.

The process of the present invention may be generally outlined as follows. Titaniferous material such as ilmenite containing substantial amount of iron in ferric state is mixed with sulfuric acid of strength and in proportions subsequently indicated. The mass is then heated in an autoclave under hereinafter described conditions of temperature and pressure to form a titanium oxygen compound, probably all in the form of titanyl sulfate. Among other conditions, heating is conducted so that the titanyl sulfate is not appreciably decomposed to metatitanic acid and so that basic ferric iron associated with the titanium is not converted to a form so highly basic as to prevent subsequent separation of iron from the titanium compound. The product of this heating operation is a soft cake-like mass comprising chiefly titanyl sulfate in relatively water insoluble form, ferric sulfate, some ferrous sulfate, some free sulfuric acid, and some water insoluble basic ferric sulfate more or less bound up with the titanium. After cooling, the mass is leached with water under conditions as to separate from the solid titanium as much water soluble ferrous and ferric sulfate as feasible, and to avoid any appreciable decomposition of titanium compound by the leaching liquor. In this way most of the associated iron is washed out and there is produced a solid easily filterable titanyl sulfate contaminated with a small amount of basic iron sulfate, and a liquor containing say 85% or more of the total iron of the original ore and a relatively small amount of soluble titanium and free sulfuric acid. The titanium oxide compound, after separation from the liquor by filtration and washing, is subjected to a hereinafter described purification treatment by means of which the titanyl sulfate is converted to metatitanic acid and basic ferric sulfate still associated with titanium is removed to a degree such that the product, after calcination, is a titanium oxide of pigment grade.

In practice of the invention, the titaniferous materials used as sources of titanium are preferably titanium ores such as ilmenite containing substantial amounts of iron in ferric state. Ores of this type usually contain more than 50% $TiO_2$ and sometimes less than 50% total iron in varying proportions of ferric and ferrous oxide. Of the total iron, as little as say 25% and as much as 80% may be in the ferric condition. The present process is carried out so that the reaction product of sulfuric acid-ore heating operation is a relatively water insoluble solid titanyl sulfate. In order to secure a titanium oxygen compound of this type, the initial titaniferous material used should contain a substantial amount of iron in the ferric state. Ilmenite ores contain sufficient ferric iron for this purpose. While the reactions taking place in the ore-acid heating operation are complicated, it appears that the presence of substantial amount of ferric iron enhances conversion of titanium to the water insoluble form and reduces loss of titanium as water soluble titanium. Whatever the reasons may be, indications are that to produce a water insoluble titanyl sulfate and to secure best results and the most satisfactory overall yields of titanium, the titaniferous material digested with sulfuric acid should contain as much iron in the ferric condition as is present in run-of-mine ilmenite which is usually not lower than about 15% $Fe_2O_3$.

The sulfuric acid employed should be relatively concentrated. It has been found that use of too weak an acid with the ore in the pressure digester increases the amount of water soluble titanium to an undesirable extent, and that in order to secure the best overall titanium yields the sulfuric acid should be of concentration not appreciably less than 60° Bé. The quantity of sulfuric acid used may be less than, equivalent to, or in excess of the amount theoretically required to convert titanium of the ilmenite to the normal disulfate $Ti(SO_4)_2$. While fairly good ore decomposition and yields of titanium result where the quantity of acid employed is as low as 80% of that theoretically necessary, in the particular pressure digestion operation of the invention it has been found that the more satisfactory ore decomposition and yields of titanium may be obtained where the amount of acid used is at least equivalent to that theoretically needed for formation of normal titanium and iron sulfates. On the other hand, sulfuric acid may be used in amount up to say 120% of the theoretical requirements. It is more desirable to employ an equivalent or excess amount of acid so that at the end of the digestion operation the mass is in a slightly mushy condition as distinguished from a solid cake. Although formation of a solid cake is not materially objectionable, better decomposition of the ore may be had where the amount of acid used is such that the mass at the end of the digestion stage does not set up in a hard solid mass.

Ilmenite ore, preferably finely divided say 100 to 300 mesh, and the sulfuric acid are charged into a suitable pressure digester such as an autoclave 10 constructed so that the material therein may be heated at controlled temperatures. The mass is then heated at temperatures not less than about 180° C. and not in excess of about 220° C. under the pressure generated by such heating to form a solid titanium oxygen compound, titanyl sulfate $TiO(SO_4)$.

It is recognized in the art that the presence of appreciable iron affects the color and the pigment value of titanium oxides. In usual commercial practice and also in the present process the final titanium oxide pigment is obtained by calcining metatitanic acid at temperatures of the order of 800–1000° C. When any appreciable amount of titanium oxygen compound containing iron, especially basic ferric sulfate, is converted to metatitanic acid the associated iron changes to a form so highly basic that it cannot be removed by usual chemical methods, and hence the color is affected and the pigment value of the final titanium oxide is materially reduced. In accordance with the present invention it has been found that by digesting titaniferous materials of the type described with sulfuric acid of the concentration and in the proportions mentioned at temperatures not less than about 180° C. and not more than about 220° C. in a closed vessel under the pressure generated by such heating, titanium of the ore may be converted in what for practical purposes may be considered a one-step operation to predominantly titanyl sulfate and practically all of whatever basic ferric sulfate may be associated with the titanyl sulfate is in a form amenable to removal by purification methods to be subsequently described. Temperatures of not less than about 180° C. and the corresponding pressure developed should be employed to carry out the reactions involved to any satisfactory degree. By avoiding temperatures above 220° C. and the accompanying pressure conditions, decomposition of titanyl sulfate to metatitanic acid is prevented and conversion of associated basic ferric sulfate to a form too basic and of a character which cannot be removed by purification is avoided.

During the pressure digestion operation, titanium of the ore is probably first converted to the normal titanium sulfate $Ti(SO_4)_2$ which is subsequently converted to titanyl sulfate $TiO(SO_4)$ by splitting off of $SO_3$. At the end point of the heating operation the mass is a preferably slightly mushy, light-colored mass comprising solid titanyl sulfate, possibly some water soluble ferrous sulfate, a substantial amount of water soluble ferric sulfate, some free sulfuric acid, and some basic ferric sulfate more or less firmly bound up with the titanyl sulfate as a complex salt. By applying the principles of the invention, this basic ferric sulfate is held in a condition of such form and character that it may be removed by a comparatively simple and easily carried out purification operation. By carrying out the pressure digestion operation as described and thus avoiding to any appreciable extent decomposition of titanyl sulfate to metatitanic acid, the basic ferric sulfate though tied up in substantial amounts with the titanyl sulfate is still in a readily removable form and does not become converted to a condition not susceptible to removal by chemical treatment.

The end point of the heating operation may be determined by analysis of a sample of the mass. Duration of digestion at the temperature and pressure conditions indicated may be from two to four hours. A few test runs will indicate to the operator the time needed to complete the reactions under the particular conditions involved.

For purpose of avoiding use of excessive amounts of reducing agent in the subsequent purification operation, preferably the mass resulting from the heating operation, after cooling to room temperature, is subjected to a water leaching operation. Leaching is carried out preferably in digester 10 under conditions so as to first recover water soluble iron as ferric and ferrous sulfate; second, to avoid as far as feasible dissolving of titanium in the leach liquor; and third, to prevent conversion of titanyl sulfate to metatitanic acid with attendant change of the easily removable basic iron sulfate to a more difficultly removable form. The reason for such precaution is that any titanium taken up by leach liquor is lost and the over-all yield of the process is cut down. Further, conversion of any appreciable amounts of titanyl sulfate to metatitanic acid in the presence of basic ferric sulfate disturbs those basic ferric sulfate characteristics which render the iron readily removable and changes the form of the basic ferric sulfate to one so highly basic as to prevent removal of iron in the subsequent purification operation. To accomplish these aims, water is introduced into digester 10 and the cake is leached by agitating preferably with an amount of water for example about 1 to 1.5 parts of water by weight per part of the cake at temperatures preferably about 60-70° C. and not in excess of 80° C. By so proceeding, there is obtained an acid liquor containing for example 70% or more of the total iron of the ore as ferric sulfate and also variable amounts of titanium sulfate. The bulk of the titanium remains in the solid condition as a white flocculent and easily filtrable titanyl sulfate containing a small amount of basic iron sulfate and small amounts of substances such as silica contained in the initial ore. The mass is run out of vessel 10 and titanyl sulfate is filtered out in filter 11 and is ready for purification to remove basic ferric sulfate.

The following are specific illustrations of preparation of titanyl sulfate in accordance with the pressure digestion method described:

*Example 1.*—Ilmenite, 60% of the total iron content being present as $Fe_2O_3$, was mixed with 60° Bé. $H_2SO_4$ in amount theoretically required to convert titanium oxide of the ore to the disulfate. The slurry was digested in an autoclave at temperature of about 200° C. for about 3 hours. The pressure developed was about 140# per square inch. The resulting relatively mushy cake, after cooling, was leached with about 1.5 parts of water per part of cake at temperatures in the range 70-80° C. The leach liquor contained about 73% of the total iron content of ore, and some free $H_2SO_4$. The leached titanyl sulfate, after washing to remove soluble salts, comprised 8.5% $Fe_2O_3$, 46.7% $TiO_2$, and the yield was about 83% of the titanium content of the ore.

*Example 2.*—Ilmenite, 60% of the total iron content present as $Fe_2O_3$, was mixed in an autoclave with 66° Bé. $H_2SO_4$ in quantity theoretically required to convert titanium oxide of the ore to disulfate. The mass was digested for about 5 hours at temperature of about 180° C. Indicated pressure of about 140 lbs. was developed. The cake was leached at 70-80° C. with about 1.5 parts of water per part of cake. The leach liquor contained about 7.4% of the titanium of the ore, and about 69.3% of the iron of the ore. About 81.7% of the iron of the liquor was ferric sulfate. The leached and washed titanyl sulfate contained about 8.4% $Fe_2O_3$, 44.3% $TiO_2$ and 47.1 $SO_3$. The yield was about 92.6% of the titanium of the ore.

*Example 3.*—In another instance where ilmenite, in which 37% of the total iron was $Fe_2O_3$, was digested in an autoclave, with 66° Bé. $H_2SO_4$ in quantity theoretically required to convert titanium oxide to normal titanium sulfate, for about 5 hours at an indicated pressure of about 142 pounds per square inch, the resulting titanyl sulfate, after leaching with water at 70-80° C., contained about 7.4% $Fe_2O_3$, 39.8% $TiO_2$, and the yield was about 85% of the titanium content of the ore.

The leached products of the above examples are next subjected to purification to remove iron. The leached titanyl sulfates comprise upwards of 38% $TiO_2$ and usually more than 45% $SO_3$, and are contaminated with iron, as much as 9% $Fe_2O_3$ in the form of basic ferric sulfate. If such titanyl sulfates were converted to metatitanic acid and calcined in the usual way the resulting pigments would be so high in iron as to be of no commercial value as a white pigment. In the preferred embodiments of the invention, the leached titanyl sulfate products are purified while in the solid phase to remove iron, but without changing the titanium oxygen compound to the form of soluble titanium sulfate. It has been found that when the titanyl sulfate is made by the previously described heating operations, ferric iron though tied up with the titanium in substantial amounts as a complexly associated basic ferric sulfate may be reduced and converted to a water soluble form prior to or simultaneously with conversion of titanyl sulfate to metatitanic acid. Basic ferric sulfate of itself is not readily soluble in water or even in sulfuric acid of fair strength, e. g. 30%. The developments upon which the invention was based show that when leached titanyl sulfate was boiled for 2 hours in a 30% $H_2SO_4$ solution it was possible to convert less than half the iron to water soluble form, and at the same time about half of the titanium was also changed to soluble form. Nevertheless, although only difficultly and incompletely soluble in fairly strong acid, we have discovered a means by which the basic ferric sulfate associated with the titanyl sulfate may be easily converted to ferrous condition and rendered water soluble, and thus readily separable from the titanyl sulfate. We have found this end may be accomplished by treating the titanyl sulfate with a water solution containing reducing agent sufficiently powerful to reduce the ferric iron to ferrous condition. We have also found that conversion of basic ferric sulfate to ferrous condition should be effected prior to or simultaneously with conversion of the titanyl sulfate to the metatitanic acid form.

When carrying out the purification operation, the leached titanyl sulfate cake from filter 11 is mixed, in purification vessel 12 preferably equipped with boiling coils, with sufficient water to form a relatively thin slurry to which is added a reducing agent in amount equivalent to or preferably slightly in excess of that theoretically required to reduce the ferric iron of the titanyl sulfate to the ferrous state. The mass may be agitated at normal temperatures and the basic ferric iron converted to water soluble form. However, to make the purification operation more practicable it is preferred to boil the slurry, the higher temperatures facilitating change of the basic ferric sulfate to water soluble form and at the same time causing conversion of the titanyl sulfate to metatitanic acid. Furthermore, it has been found that removal of basic ferric iron, conversion of titanyl sulfate to metatitanic acid are accomplished and a much better final product obtained where the titanyl sulfate is boiled in a weak sulfuric acid solution. While use of the acid solution does not appear to be critical with respect to change of basic iron sulfate to water soluble condition, for some unexplained reason the ultimate product obtained is a higher grade when a weak acid solution of $H_2SO_4$ concentration of not more than 23% is used.

Any suitable reducing agent such as strong reducing gases, or metals such as zinc, aluminum or iron, or a reducing salt such as titanous sulfate $Ti_2(SO_4)_3$ may be used. The slurry is boiled for a substantial period of time depending more or less upon the size of the batch and the quantity of ferric iron contained in the sulfate. During the boiling operation the iron is reduced to the ferrous state, becomes soluble and goes into solution as ferrous sulfate. Titanyl sulfate is converted in the solid phase to metatitanic acid liberating $SO_3$ which is dissolved in the solution to form sulfuric acid. The purified metatitanic acid, after separation from the liquor as by filter 13 and washing substantially free of soluble salts, contains usually less than 0.05% ferric iron as $Fe_2O_3$. The metatitanic acid may also contain say 3 to 5% of $SO_3$ which may be removed by treatment in accordance with known procedure for example as in Jebson U. S. Patent 1,361,867 of December 20, 1920. The purified metatitanic acid washed free of soluble salts is then calcined in retort 14 at temperatures of about 800°–1000° C. in accordance with customary practice to convert the metatitanic acid to pigment form.

Following is an example of purification of titanyl sulfate:

*Example 4.*—Leached titanyl sulfate containing about 8% $Fe_2O_3$ and about 42% $TiO_2$ was boiled in 19% $H_2SO_4$ solution for 2 hours in the presence of sufficient titanous sulfate to reduce ferric iron to ferrous. After filtration, washing out of soluble iron, and drying at 100° C., the product contained 75.9% $TiO_2$ and 0.02% $Fe_2O_3$.

In accordance with the procedure described, the titanyl sulfate product of the heating operation is leached with water primarily for the purpose of recovering most of the iron of the original ore as ferric sulfate, and secondarily to avoid the use of a relatively large amount of reducing agent in the purification operation. In practice, there may be instances where for some reason there is no particular advantage in recovering the iron as ferric sulfate. In this situation the water leaching and accompanying filtration steps may be omitted, and the titanyl sulfate cake produced by the heating operation is introduced directly into a weak say 5% $H_2SO_4$ solution in quantity to make a thin slurry. On introduction of the mass into this liquor the ferric and ferrous sulfates dissolve and the resultant mass comprises titanyl sulfate and associated basic ferric sulfate in solid form, and ferrous and ferric sulfate, predominantly the latter, in solution. Ferric sulfate in solution is first reduced to ferrous, and for this purpose the slurry may be gassed with $SO_2$ in quantity and for a time interval sufficient to reduce most of the iron in solution to the ferrous condition. During gassing, the solution becomes slightly more acid on account of reduction of ferric sulfate, and with this in mind the acidity of the initial solution should be such that at the time the blowing with $SO_2$ is completed the acidity of the solution is not more than about 23% $H_2SO_4$. At this stage a more powerful reducing agent such as metallic zinc, aluminum, or iron, or preferably titanous sulfate is added in quantity to complete reduction of whatever ferric iron may be still in solution and to provide for reduction to the ferrous condition of the basic ferric sulfate associated with the solid titanyl sulfate. The resultant mass is then boiled as previously described, iron of the basic ferric sulfate is converted to soluble form, most of the $SO_3$ associated with the titanyl sulfate is liberated, and the titanyl sulfate is converted to metatitanic acid which is filtered out and washed, treated for removal of remaining associated 3–5% of $SO_3$, and calcined as before.

In the purification method described, titanyl sulfate is purified in the solid phase without dissolving. There may be instances where, for example on account of a relatively high gangue content in the original ore, it is desirable to separate such gangue from the titanium. As indicated in the discussion of the previously described purification operation, treatment of the titanyl sulfate cake with aqueous liquor containing reducing agent in quantity to reduce the contaminating basic iron sulfate renders the basic ferric sulfate readily soluble in the aqueous liquor. It has additionally been found that similar reducing conditions materially increase the solubility of the titanium of the titanyl sulfate cake. For example, where a leached titanyl sulfate cake was boiled in 30% sulfuric acid for about 2 hours a little less than half of both the iron and the titanium were dissolved and passed into solution. However, it has been found that when there is added to the purification liquor a reducing agent, for example titanous sulfate, in quantity to reduce basic ferric sulfate of the cake to ferrous state and the acid strength of the solution is increased slightly, not only does the basic ferric sulfate become readily soluble but also the solubility of the titanium is greatly increased. For example, where a leached titanyl sulfate cake assaying 42.7% $TiO_2$ and about 4.8% $Fe_2O_3$ was boiled in a 35% $H_2SO_4$ solution containing a reducing agent such as titanous sulfate in amount to reduce the basic ferric sulfate to ferrous sulfate, about 97.7% of the titanium and practically 100% of the iron content of the leached cake were dissolved.

Accordingly, where the original ore is high in gangue and it is desirable to separate the same from the titanium, the titanyl sulfate cake may be boiled in a relatively weak solution of $H_2SO_4$ concentration of not in excess of about 40% with a sufficient reducing agent to reduce the basic ferric sulfate of the cake to ferrous sulfate, and most of the titanium and iron go into solution as titanium sulfate and ferrous sulfate. The liquor thus obtained may be separated from residual solid matter by decantation, clarified and the titanium hydrolyzed by boiling as known in the art. In this operation, the solution from which the titanium is hydrolytically precipitated to form metatitanic acid is very low in iron and contains not more than about 10–12% of the iron of the original ore. Hence, this procedure has the advantage of making possible hydrolytic precipitation of metatitanic acid in the presence of a very small amount of iron with the result that iron contamination of the metatitanic acid is minimized. The metatitanic acid may be purified to remove associated $SO_3$, washed free of soluble salts, and calcined.

The purification method disclosed herein is also described in our copending application Serial No. 269,042, filed April 20, 1939.

We claim:
1. The method for making titanium-oxygen compound which comprises introducing into an autoclave ilmenite ore and sulfuric acid of strength not less than 60° Bé. and in amount not less than 80% of that needed to convert titanium of said ilmenite to the disulfate, heating the mass at temperatures not less than about 180° C. and not more than about 220° C. under pressure developed by said heating, maintaining said conditions of heat and pressure for a substantial time interval sufficient to produce a relatively solid mass in which acid reacted titanium is present predominantly as $TiOSO_4$ whereby the bulk of acid reacted titanium of the mass is water insoluble titanium sulfate, treating the mass at temperatures not more than about 80° C. with water in quantity to leach out water soluble iron sulfate, separating from the iron sulfate liquor residual solid titanium sulfate compound having ferric sulfate associated therewith, forming an aqueous mixture of said compound, boiling said mixture in the presence of a reducing agent in amount sufficient to reduce ferric iron of said compound to the ferrous state whereby to convert ferric iron to ferrous and to convert titanium to solid titanium-oxygen compound, and separating the residual solid titanium-oxygen compound from the liquor.

2. The method for making titanium-oxygen compound which comprises introducing into an autoclave titaniferous material containing ferric iron in amount not less than the equivalent of 15% $Fe_2O_3$, and sulfuric acid of strength not less than 60° Bé. and in amount not less than 80% of that needed to convert titanium of said material to the disulfate, heating the mass at temperatures not less than about 180° C. under pressure developed by said heating, maintaining said conditions of heat and pressure for a substantial time interval sufficient to produce a relatively solid mass in which acid reacted titanium is present predominantly as $TiOSO_4$ whereby the bulk of acid reacted titanium of the mass is water insoluble titanium sulfate, treating the mass at temperatures not more than about 80° C. with water in quantity to leach out water soluble iron sulfate, separating from the iron sulfate liquor residual solid titanium sulfate compound having ferric sulfate associated therewith, forming an aqueous mixture of said compound, boiling said mixture in the presence of a reducing agent in amount sufficient to reduce ferric iron of said compound to the ferrous state whereby to convert ferric iron to ferrous and to convert titanium to solid titanium-oxygen compound, and separating the residual solid titanium-oxygen compound from the liquor.

3. The method for making titanium-oxygen compound which comprises introducing into an autoclave ilmenite ore, having the bulk of the iron thereof in ferric state, and sulfuric acid of strength not less than 60° Bé. and in amount not less than the equivalent of that needed to convert titanium of said ilmenite to the disulfate, heating the mass at temperatures not less than about 180° C. and not more than about 220° C. under pressure developed by said heating, maintaining said conditions of heat and pressure for a substantial time interval sufficient to produce a relatively solid mass in which acid reacted titanium is present predominantly as $TiOSO_4$ whereby the bulk of acid reacted titanium of the mass is water insoluble titanium sulfate, treating the mass at temperatures not more than about 80° C. with water in quantity to leach out water soluble iron sulfate, separating from the iron sulfate liquor residual solid titanium sulfate compound having ferric sulfate associated therewith, forming an aqueous mixture of said compound, boiling said mixture in the presence of a reducing agent in amount sufficient to reduce ferric iron of said compound to the ferrous state whereby to convert ferric iron to ferrous and to convert titanium to solid titanium-oxygen compound, and separating the residual solid titanium-oxygen compound from the liquor.

HENRY F. MERRIAM.
MAXWELL J. BROOKS.